United States Patent
Kim et al.

(10) Patent No.: US 6,208,590 B1
(45) Date of Patent: Mar. 27, 2001

(54) SAGNAC INTERFEROMETRIC SENSOR ARRAY FOR ACOUSTIC SENSING AND METHOD OF DETECTING ACOUSTIC SIGNALS

(75) Inventors: Byoung Yoon Kim; Wang Joo Lee; Ki Ho Han, all of Taejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 0 days.

(21) Appl. No.: 09/434,169

(22) Filed: Nov. 4, 1999

(30) Foreign Application Priority Data

May 4, 1999 (KR) .................................................. 99-15982

(51) Int. Cl.$^7$ ................................ H04R 1/44; G01B 9/02
(52) U.S. Cl. ........................................... 367/149; 356/345
(58) Field of Search ..................................... 367/149, 153; 356/345, 350; 250/227.14, 227.16, 227.19, 201.9

(56) References Cited

U.S. PATENT DOCUMENTS

| | | | |
|---|---|---|---|
| 4,898,468 | * | 2/1990 | Udd .................................... 356/345 |
| 5,953,122 | * | 9/1999 | Ecke et al. .......................... 356/350 |
| 6,034,924 | * | 3/2000 | Vakoc ................................. 367/149 |
| 6,097,486 | * | 8/2000 | Vakoc et al. ........................ 356/345 |

OTHER PUBLICATIONS

R. T. de Carvalho et al., "The Sagnac Interferometer as a Two–Parameter Sensor," *Journal of Lightwave Technology*, vol. 13, No. 7, Jul. 1995, pp. 1250–1255.

* cited by examiner

Primary Examiner—Ian J. Lobo
(74) Attorney, Agent, or Firm—Oliff & Berridge, PLC

(57) ABSTRACT

The present invention relates to a Sagnac interferometric sensor array for acoustic sensing and method of sensing acoustic signal that is able to observe acoustic signals coming from several sources simultaneously. The acoustic sensor of the present invention is a Sagnac interferometric sensor array employing a depolarizer. Unlike a single Sagnac interferometric sensor, two light signals traveling in the opposite directions from each other pass through the off-center position of the loop at different times in the Sagnac loop when they are pulses, and thus, it is possible for the light pulses to be maintained at a constant phase difference by giving arbitrarily a certain amount of phase to them. By using the fact, the interferometer is constructed in such a way that the interference light output coincides with the applied acoustic signals in waveform. This invention suggests a way of fabricating an array of fiber-optic acoustic sensors that is easy to be made and is highly sensitive at some frequency band.

13 Claims, 3 Drawing Sheets

SAGNAC INTERFEROMETRIC SENSOR ARRAY FOR ACOUSTIC SENSING AND METHOD OF DETECTING ACOUSTIC SIGNALS

BACKGROUND OF THE INVENTION

1. Field of the Invention

The present invention relates to an acoustic sensor and method of detecting acoustic signals, and more particularly, to both a Sagnac interferometric sensor array for acoustic sensing and method of detecting acoustic signals in which simultaneous measurement of acoustic signals originating from multiple sources is possible.

2. Description of the Prior Art

Fiber-optic interferometric sensors are based upon the phase modulation in light passing through two fiber optic paths which occurs when those fibers are exposed to physical quantities to be measured. The light beams/pulses having passed through the fiber optic paths interfere with each other, forming an interference signal which has intensity variations due to the phase difference between the light beams/pulses. The information about the physical quantities to be measured can be obtained from the signal processing of the intensity variations. Such fiber-optic interferometric sensors have the superior sensitivity to that of a conventional generic sensor and can be used in the chemically hazardous environments.

A conventional fiber-optic interferometric array for acoustic sensing has been constructed only in a configuration of Mach-Zehnder or Michelson interferometer in order to obtain flat response (phase difference caused by a unit acoustic pressure per a unit length of optical fiber) at acoustic frequencies. It exhibits a relatively good response at low acoustic frequencies. However, it is subjected to influence of the intensity noise created by the phase fluctuation of light source, which is attributed mainly to mismatch of optical path length, and shows a significant phase drift arising from environmental perturbation such as temperature. Thus, it is inevitable to employ a complex scheme of signal processing for data acquisition and further it might loose the signal completely due to random polarization change of interfering lights.

On the other hand, in a conventional acoustic sensor composed with Sagnac interferometer there is no source phase-induced intensity noise because of its intrinsic complete path balance and the signal fading due to variation of polarization is avoided easily. However, its responsivity is dependent upon the frequency of acoustic signal and decreases at low frequencies. So, only a single Sagnac interferometer-type sensor has been studied in the academic point of view.

The architecture of a single Sagnac interferometric acoustic sensor is presented and a way of signal processing is explained as follows.

FIG. 1 is a schematic diagram for a single Sagnac interferometer of acoustic sensor associated with an ideal 3×3 directional coupler at the input and output ports for signal processing. Referring to FIG. 1, light from a light source 100 is divided by a 3×3 directional coupler 120 into two light beams and propagates around a Sagnac loop 130. One of the light beams in a Sagnac loop 130 circles clockwise and the other does counterclockwise. The light beams propagating in the opposite directions from each other recombine at the 3×3 directional coupler 120 and produce interference light. Then, the output signals of interference are detected by a first and a second photodetectors 160 and 170, and are input to a differential amplifier 180 to produce a difference between interference output intensities.

In the above configuration of acoustic sensor, if an acoustic signal is applied to a fiber-optic sensing coil 140, a phase difference is generated in two counter-propagating light beams. In addition to the phase difference $\Delta\phi(t)$ caused by an applied acoustic signal, an extra phase bias of $\pm 2/3\pi$ generated in the 3×3 directional coupler 120 is augmented. The output intensities $I_1$ and $I_2$ detected at the first and the second detectors 160 and 170 are represented as following equations 1 and 2.

$$I_1 = \frac{2}{9}RP_0\left[1 + \cos\left(\Delta\phi(t) - \frac{2\pi}{3}\right)\right] \quad \text{[equation 1]}$$

$$I_2 = \frac{2}{9}RP_0\left[1 + \cos\left(\Delta\phi(t) - \frac{2\pi}{3}\right)\right], \quad \text{[equation 2]}$$

where $P_0$ is the input light intensity, $\Delta\phi(t)$ is the phase difference caused by an applied acoustic signal, and R is the responsivity of the photodetector.

When the polarization states of two light beams are identical, the difference $I_{diff}$ of interference output intensities after the differential amplifier is expressed as following equation 3.

$$I_{diff} = I_1 - I_2 = \frac{2\sqrt{3}}{9}RP_0\sin(\Delta\phi(t)) \quad \text{[equation 3]}$$

equation 3 can be approximated as in Equation 4 for a small value of $\Delta\phi(t)$.

$$I_{diff} \approx \frac{2\sqrt{3}}{9}RP_0\Delta\phi(t) \quad \text{[equation 4]}$$

Since the difference in interference output intensities $I_{diff}$ is proportional to $\Delta\phi(t)$, the applied acoustic signal can be gained by measuring $I_{diff}$.

However, in order to construct such a device, it is inevitable to use an ideal 3×3 directional coupler and two photodetectors of high accuracy. In addition, if this device is used to construct an array of sensors, the circuitry for signal processing becomes complex because the same number of differential amplifiers as sensors are necessary to use. It is also very difficult to make two interference outputs arrive at the differential amplifier with the same transit time.

Despite difficulties described above, if delay lines are incorporated in the Sagnac interferometer, the responsivity similar to that of Mach-Zehnder interferometer can be obtained in frequencies except at extremely low frequencies. For some frequency range, it is possible to achieve better responsivity.

SUMMARY OF THE INVENTION

Therefore, it is an object of the present invention to provide an acoustic sensor in which the source phase-induced intensity noise and the signal fading due to polarization fluctuation that are the problems in both Mach-Zehnder and Michelson interferometers are prevented.

It is another object of the present invention to provide a method of using the above acoustic sensor without the complex electrical signal processing.

These and other objects and advantages can be achieved by providing a novel Sagnac interferometric sensor array for acoustic sensing which employs a depolarizer. The features are unique compared to a single acoustic sensor. When incident light is pulsed, two light pulses in the Sagnac loop that propagate in opposite directions pass through an asymmetric position at different timings that is off from the center of the loop. By using this characteristic, an arrayed interferometer is constructed in such a way that the light output of interference is coincident with an applied acoustic signal in their waveform by inducing a constant phase difference between the two light pulses.

DESCRIPTION OF THE PREFERRED EMBODIMENT

Preferred embodiments of the invention will be described hereinafter in reference with appended drawings.

Figure 1:
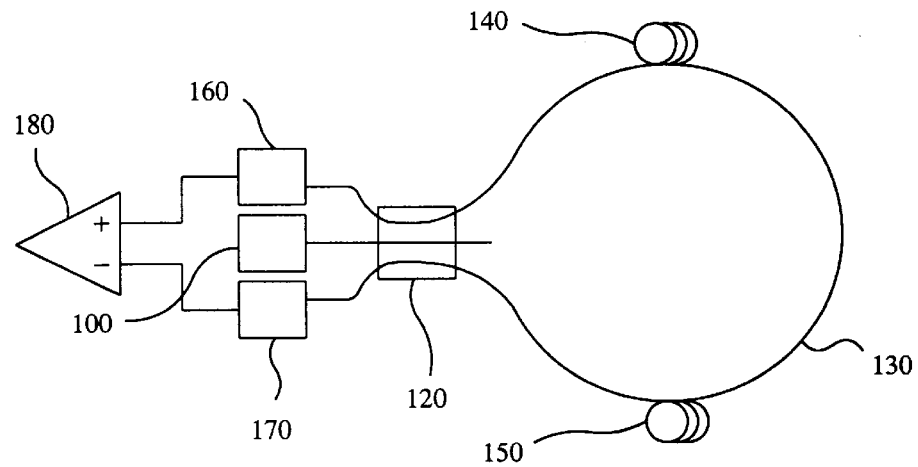
FIG. 1 is a schematic diagram of a conventional single Sagnac interferometric acoustic sensor.
Figure 2:
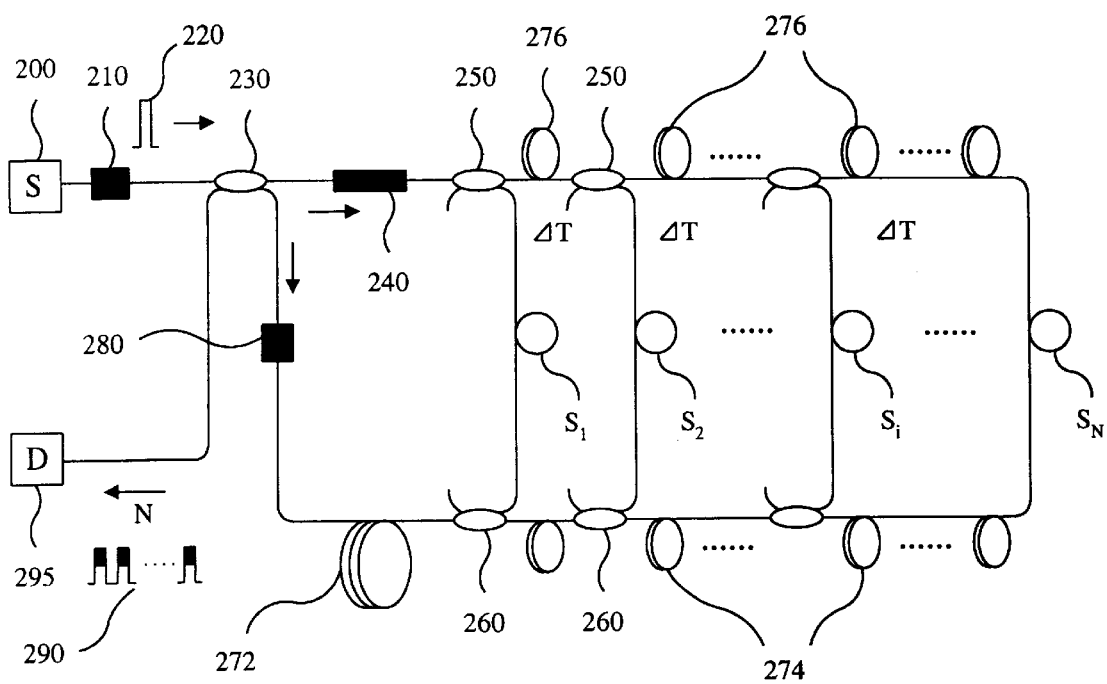
FIG. 2 is a schematic diagram of a fiber-optic Sagnac interferometer sensor array for acoustic sensing according to an embodiment of the present invention.

FIG. 2 is a schematic diagram of a fiber-optic Sagnac interferometer array for acoustic sensing according to an embodiment of the present invention. Referring to FIG. 2, light from a light source 200 transforms into pulse 220 by an optical pulse generator 210 such as an acousto-optic modulator (AOM) or an integrated optic chip (IOC). The pulsed light 220 is coupled into N Sagnac loops that forms an array via an input/output directional coupler 230. The incident light pulse is separated into two such that one pulse travels clockwise and the other moves counterclockwise in the loop. The pulse that travels clockwise passes through firstly a depolarizer 240 in the first Sagnac loop. Whenever it passes through directional couplers 250 at the upper bus of the array, the light pulse is divided into parts and they pass through the sensor heads $S_1$, $S_2$, ..., and $S_N$, respectively. In the lower half part of the first Sagnac loop, there is a main delay line 272 and a phase modulator 280 is placed in between the main delay lines 272 and the input/output directional coupler 230. On the other hand, except the first Sagnac loop, each Sagnac loop is constructed with the upper sub-delay line 276 in the upper bus and the lower sub-delay line 274 in the lower bus, respectively. All the Sagnac loops are linked with each other by lower directional couplers 260, too.

Accordingly, alight pulse that circles clockwise the optical path of Sagnac loops travels the lower sub-delay line 274, the lower directional coupler 260, the main delay line 272 and the phase modulator 280 successively. Eventually, one incident light pulse separated into N pulses that eventually couples to the input/output directional coupler 230. Since the light pulses that pass through sensor heads $S_1$, ..., and $S_N$ propagate through both the upper sub-delay line 276 and the lower sub-delay line 274 in each loop, their optical paths are increased in the same amount after each loop. Thus, the light pulses that come to the input/output directional coupler 230 experience a time delay $\Delta T$ between the adjacent loops.

On the other hand, a light pulse that propagates counter-clockwise in the optical paths of Sagnac loops passes through firstly the phase modulator 280 and the main delay line 272. Then, whenever it passes through the lower sub-delay line 274, the part of light pulse goes through sensor head of each loop, the upper directional coupler 250, and the depolarizer 240, and eventually N pulses input to the input/output directional coupler 230 after all the N loops. In the same way, the light pulse that travel counter-clockwise experience the time delay $\Delta T$ in the transit time because of both the upper sub-delay line 276 and the lower sub-delay line 274 in the loop. All the directional couplers 230, 250, and 260 are set their coupling ratios such that the intensities of all the light pulses at the sensor heads maintained to be equal. At the input/output directional coupler 230, only two light pulses among others that travel clockwise and counterclockwise in the same loop interfere with each other. The pulses that interfere with each other do not possess any intensity noise due to the phase fluctuation of the source since they are generated at the same time at the light source. However, the transit times of the two light pulses that travel in both directions become different at the sensor head due to the time delay generated when the light pulses pass through the main delay line 272. Thus, the light pulses experience different phase changes so that the interference output intensity varies according to the phase difference between the two pulses. While the parts of intensities of N interference pulses re-enter the light source, the rest of them 290 are detected at a photodetector 295. Then, the N light pulses are separated by using electronic switches so that all the acoustic signals applied to the N sensor heads are detected individually. If the length of each upper sub-delay line is the same as that of the very under-placed sub-delay line, there is no difference in time delays at each of sensor heads between the two counter-propagating pulses in each Sagnac loop. In this case, upon adjusting the length of the main delay line 272, it is possible to adjust the time delay corresponding to each sensor head. In general, the responsivity of Sagnac sensor is determined by the time delay. If the period of an acoustic signal becomes identical to twice as much as the time delay, the two light pulses that travel in opposite directions become out of phase so that the sensor exhibits the highest responsivity. For instances, the highest sensitivity is achieved at the time delays of 1 ms, 0.5 ms, and 50 $\mu$s for acoustic frequencies of 500 Hz, 1 kHz, and 10 kHz, respectively.

The interferometer of the present invention comprises the depolarizer 240 such as a Lyot depolarizer that is made with two pieces of a few meters of high-birefringent optical fibers. When the linewidth of light from the light source 200 is broad, the depolarizer 240 makes the polarization of its output light different depending upon its wavelengths. Thus, signal disappearance is prohibited due to depolarization of the light by the depolarizer.

Next, the signal process for the fiber-optic Sagnac interferometer array of FIG. 2 will be described.

By using the phase modulator 280 such as that of lithium niobate ($LiNbO_3$), the phase of $\pi/2$ is added to a light pulse except the phase caused by acoustic signal with respect to the other light pulse that travels in the opposite direction. So, there is no need of electrical signal process. When the phase difference of two interfering light pulses is $\Delta\phi(t)$, the output of AC signal $I_{ac}$ of a general interferometer is dependent on $\cos[\Delta\phi(t)]$. If $\Delta\phi(t)$ is added artificially by an amount of $\pi/2$, the output of $I_{ac}$ can be represented by the following equation 5.

$$I_{ac} \propto \cos\left[\Delta\phi(t) + \frac{\pi}{2}\right] = -\sin[\Delta\phi(t)] \qquad [\text{equation 5}]$$

Therefore, since $\sin[\Delta\phi(t)]$ is proportional to $\Delta\phi(t)$ for small value of $\Delta\phi(t)$ such as acoustic signal, the information from the detected acoustic signal can be obtained by directly observing $I_{ac}$ without any further signal processing. Unlike a gyroscope, a temperature sensor, or a strain sensor, an acoustic sensor is mainly used to detect simply the existence and the kinds of acoustic sources. So, the detection of $\sin[\Delta\phi(t)]$ is enough for the use instead of measuring exact quantity of $\Delta\phi(t)$.

On the other hand, as illustrated in FIG. 2, the time difference between the adjacent loops can be kept constant as $\Delta T$ by appropriately determining lengths of the upper and lower sub-delay lines placed over and under each sensor head. The phase responsivity of such a Sagnac interferometer is explained as follows.

Supposing that the lengths of the i-th lower sub-delay line 274 and the i-th upper sub-delay line 276 are $l_i$ and $k_i$, respectively, and the lengths of each rung including a sensor head are identical, it should be satisfied to be $l_i + k_i = v\Delta T$ (where $v$ is the speed of light in the optical fiber) for a given $\Delta T$, and $l_i$ and $k_i$ are selected to be $0 \leq l_i, k_i \leq v\Delta T$. If an acoustic signal $\delta\beta_0 \sin \omega t$ having an amplitude of $\delta\beta_0$ and a frequency $\omega$ is applied to the sensor head $S_1$, the phase difference generated in the unit loop including the sensor head $S_1$ is expressed as in equation 6.

$$\Delta\Phi_1 = 2\delta\beta_0 L_s \text{sinc}\left(\frac{\omega L_s}{2v}\right)\sin\left(\frac{\omega L_d}{2v}\right) \qquad [\text{equation 6}]$$

where, $L_s$ is the length of the first sensor head $S_1$, and $L_d$ is the length from $S_1$ to the symmetrically opposite position of the loop.

The phase difference of the nth unit loop including a sensor head $S_N$ and the sub-delay lines is expressed as in equation 7.

$$\Delta\Phi_n = 2\delta\beta_0 L_{sn} \text{sinc}\left(\frac{\omega L_{sn}}{2v}\right)\sin\frac{\omega}{2v}\left[L_d + \sum_{i=1}^{n-1}(l_i - k_i)\right], \qquad [\text{equation 7}]$$

$$n = 2, 3, \ldots, N$$

where $L_{sn}$ is the length of n-th sensor head, the value of $l_i - k_i$ can be arbitrarily determined in the range $-v\Delta T \leq l_i - k_i \leq v\Delta T$ for each i.

Assuming $L_{sn}$ is chosen to be maximum value of $L_s$ which offers the highest responsivity for all n, and the lengths of lower and upper delay coils are $l_i = m_i v\Delta T$, $k_i = (1-m_i)v\Delta T$ ($0 \leq m_i \leq 1$, $i = 1, 2, \ldots, N-1$) respectively, then the equation 7 is re-formulated as in equation 8.

$$\Delta\Phi_n = 2\delta\beta_0 L_s \text{sinc}\left(\frac{\omega L_s}{2v}\right)\sin\frac{\omega}{2v}\left[L_d + v\Delta T \sum_{i=1}^{n-1}(2m_i - 1)\right], \qquad [\text{equation 8}]$$

$$n = 2, 3, \ldots, N$$

Equation 8 shows that the change of phase responsivity is dependent upon choice of the lengths of the upper and lower sub-delay lines.

If $m_i = \frac{1}{2}$ for all i; that is, both lengths of the upper and lower sub-delay lines are set at $v\Delta T/2$, the phase difference produced by all the loops can be kept constant at $\Delta\Phi_1$.

If $m_i = 1$ for all i; that is, only the lower sub-delay line has the length of $v\Delta T$, the proper frequency of a sensor head at each loop decreases as n increases as expressed in the equation 8.

On the other hand, if $m_i = 0$ for all i; that is, only the upper sub-delay line has the length of $v\Delta T$; the proper frequency of a sensor head at each loop increases as n increases.

In addition, it is possible to adjust arbitrarily the phase responsivities of each of N loops differently or equally in quantity from one another if the lengths of the i-th sub-delay lines are decided by proper choice of $m_i$. Such a fine adjustability of $m_i$ is expected to allow the arrayed Sagnac interferometer to compensate for the noise due to the amplification that is inevitable for a large-scale array using fiber-optic amplifier.

Figure 3:
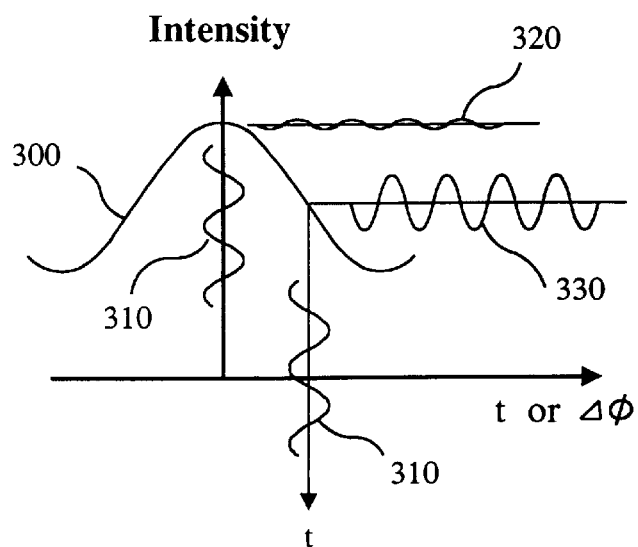
FIG. 3 is a graph of the interference output intensity plotted both at various operation points and for the existence of $\pi/2$ at the phase modulator as depicted in FIG. 2 when acoustic signals of equal intensity are applied.

FIG. 3 is a graph of the interference output intensity plotted both at various operation points and for the existence of $\pi/2$ by the phase modulator as depicted in FIG. 2 when acoustic signals of equal intensity are applied. In FIG. 3, reference numeral 300 represents a typical output of the interferometer, 310 a typical input signal to the interferometer, 320 a typical output curve for the operation point of 0, and 330 a output curve for the operation point of $\pi/2$, respectively. Referring to FIG. 3, it is understood that the response becomes the highest when the phase modulation is $\pi/2$ and also, it is not necessary to use any signal processing.

Figure 4:
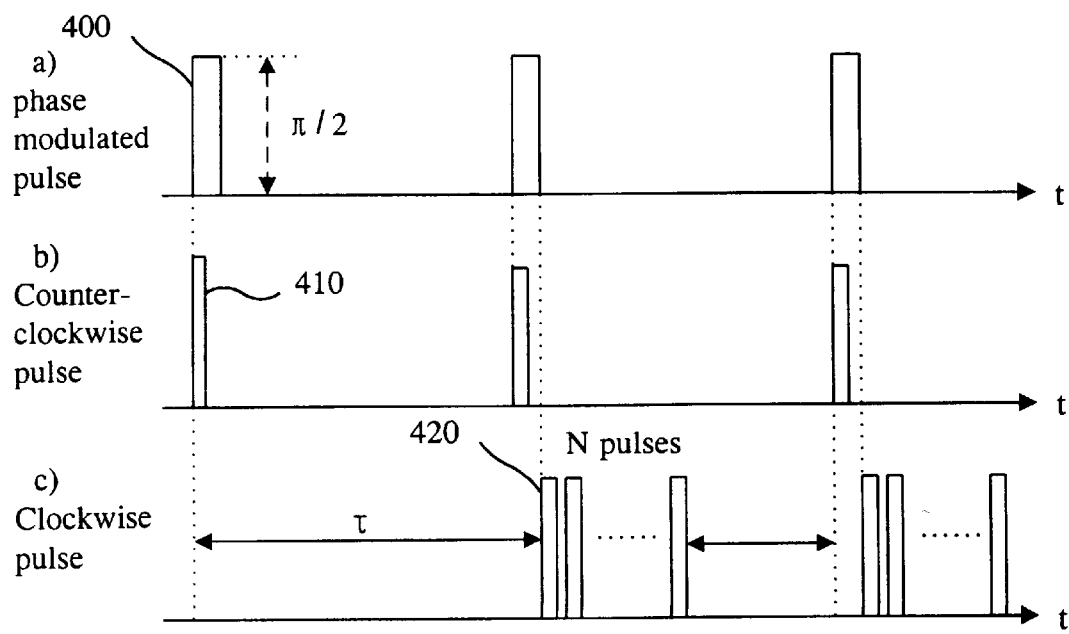
FIG. 4 is a graph of the temporal relation and timing, which is seen at the phase modulator, among a signal by the phase modulator and the two light pulses that propagate in opposite directions when they are in a phase difference of $\pi/2$.

FIG. 4 is a graph of the temporal relation and timing, which is seen at the phase modulator, among a signal by the phase modulator and the two light pulses that propagate in opposite directions when they are in a phase difference of $\pi/2$.

FIG. 4 *a*) represents a pulsed phase modulation signal 400. FIG. 4 *b*) represents a pattern of light pulse 410 in time domain that travels in counterclockwise (CCW) direction through the phase modulator in the arrayed fiber-optic Sagnac interferometer of FIG. 2. FIG. 4 *c*) represents a pattern of light pulse 420 in time domain that travels in clockwise (CW) direction through the phase modulator in the arrayed fiber optic Sagnac interferometer of FIG. 2.

Firstly, a phase modulation signal 400 and a light pulse are synchronized and their difference in time is allowed to adjust. Then, the light pulse 410 circling counterclockwise (in FIG. 2) experiences $\pi/2$ phase as shown in FIG. 4. The light pulse traveling clockwise passes through the array of N sensors and becomes N light pulses 420 entering the phase modulator. If all the N pulses is set such that they all experience 0 phase, the N interference pulses at the output are to be added by an amount of $\pi/2$ phase difference. In this case, the following facts should be considered properly. Suppose that the pulse width of phase modulation is $T_m$ and the width of light pulse is $T_0$. Then, $T_m \geq T_0$ and $\Delta T \geq T_m$ should be satisfied first, where $\Delta T$ is the time delay for light pulses in the adjacent loops. In addition, as in FIGS. 4 *b*) and *c*), the pulse repetition rate of incident light pulse is limited because after all the previous N clockwise pulses and a counter-clockwise pulse have passed completely through the modulator, the next N clockwise pulses and a counter-clockwise pulse should do, otherwise the previous and the next pulses overlap at the phase modulator Hence, the repetition rate of incident light pulse R is given as R≦1/[$T_m+T_0+(N-1)\Delta T$]. In addition, in order to obtain the phase difference of $\pi/2$ for all the N pulses traveling in both directions, the two counter-propagating light pulses should be passed through the phase modulator at different times. So, it is very important to place the phase modulator at the proper position. For a given R as depicted in FIG. 4, the phase modulator in the loop should be located within the boundary that is expressed as in equatoin 9.

$$\frac{1}{R} \cdot n + T_m \leq \tau \leq \frac{1}{R} \cdot (n+1) - [T_0 + (N-1)\Delta T], \quad \text{[equation 9]}$$

$$n = 0, 1, 2, \ldots$$

where $\tau$ is the transit time taken by the light pulse from the phase modulator of the first loop including the sensor head $S_1$ to the symmetric location in the opposite side of the loop. The transit time $\tau$ can be adjusted by placing the phase modulator at an arbitrary location in the loop. According to the equation 9, the number of locations ($n_{max}+1$) where the phase modulator can be placed are dependent upon the ratio of the pulse repetition rate to the length of the first loop, exactly, $v(\tau-T_m)$.

If R is set at its maximum value of $1/[T_m+T_0+(N-1)\Delta T]$, the location of the phase modulator is limited to a few points in first loop. As explained above, after the light pulses traveling in the opposite directions are modulated in their phase separately, the phase difference is set to become $\pi/2$ by adjusting the operation voltage of the phase modulator. Then, since the ac output of interferometer $I_{ac}$ is proportional to sin [$\Delta\phi(t)$], one can obtain the phase difference of $\Delta\phi(t)$ by an input acoustic signal without any signal processing. The fundamental reason for obtaining the reliable phase bias of $\pi/2$ relies on the fact that the phase difference of two interfering light pulses by environment such as temperature scarcely occurs in Sagnac interferometer because they experience completely the same path.

Figure 5:
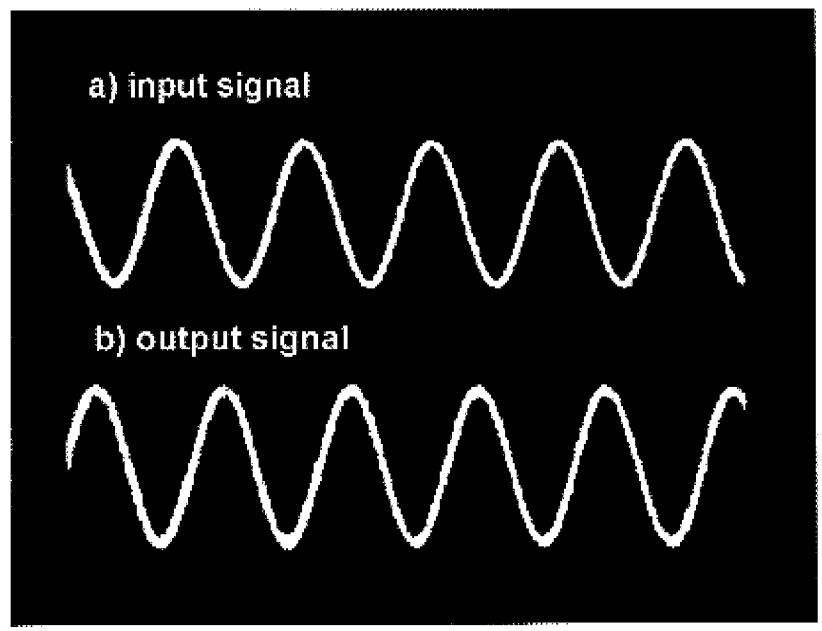
FIG. 5 is typical results observed for a fiber-optic Sagnac interferometer array for acoustic sensing composed of two sensor heads as depicted in FIG. 2.

FIG. 5 is typical results observed for a fiber-optic Sagnac interferometer array for acoustic sensing composed of two sensor heads as depicted in FIG. 2. A light source was obtained by using the amplified spontaneous emission (ASE) of erbium-doped fiber (EDF) of broad linewidth and a Mach-Zehnder type integrated optic chip (IOC) was used as a device for generating light pulses. While the phase difference of $\pi/2$ is added to the light pulses traveling in both directions by the phase modulator as in FIG. 4, an acoustic signal of 5 kHz and 100 mrad is applied to the second sensor head $S_2$. Only the output signal from the sensor is displayed after processing with a low-pass filter. FIG. 5 a) represents an input acoustic signal and FIG. 5 b) exhibits the gated output signal originated from the second sensor head. Referring to FIG. 5, it is found that waveform of the output signal from the interferometer is identical to that of the acoustic signal applied to the sensor even if no signal processing is given.

Figure 6:
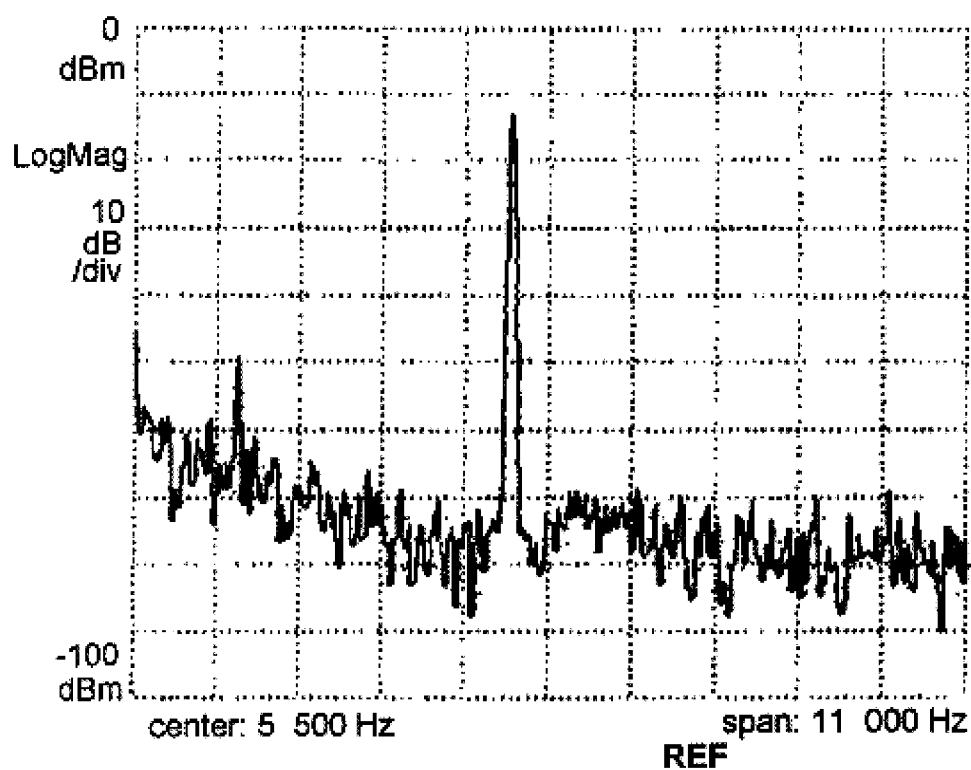
FIG. 6 is an output signal analyzed by a spectrum analyzer for the output light depicted in FIG. 5.

FIG. 6 is an output signal analyzed by a spectrum analyzer for the output depicted in FIG. 5. It is confirmed that the output signal of the interferometer is 5 kHz that is identical to that of applied acoustic signal.

According to the present invention, one can realize an arrayed fiber-optic acoustic sensor that is easily made and has the high sensitivity. Using the acoustic sensor, one can easily detect acoustic signals generated from several different origins at the same time without complex signal processing.

What is claimed is:

1. A Sagnac interferometric sensor array for acoustic sensing, said sensor array comprising:

means for generating light pulses;

an input/output directional coupler that separates the light pulses into a first and a second directions that point oppositely and direct to travel in a loop optical path, said separated light pulses recombining at said input/output directional coupler to interfere with each other after completing said loop;

first N sub-delay lines disposed in series on a portion of said loop, each of said first N sub-delay lines giving a first predetermined delay time to said light pulses;

second N sub-delay lines disposed in series on the other portion of said loop, each of said second N sub-delay lines giving a second predetermined delay time to said light pulses;

first directional couplers, each located at the front end of each first sub-delay line in order to split light pulses traveling along said first sub-delay lines;

second directional couplers, each located at the front end of each second sub-delay line in order to split light pulses traveling along said second sub-delay lines;

a plurality of means for optical path connection, each linking corresponding ones of said first and second directional couplers, and forming a unit loop optical path including one first sub-delay line and one second sub-delay line therein; and a plurality of sensor heads, each disposed at the optical path linking the corresponding front/back ends of said first and second sub-delay lines, where N is an integer greater than one.

2. The Sagnac interferometric sensor array of claim 1, wherein both the first and second sub-delay lines are made with an equal length in order to keep the phase responsivity identical for a unit loop optical path.

3. The Sagnac interferometric sensor array of claim 1, wherein the first and second sub-delay lines included in a unit loop differ in length while the total length of said first and second sub-delay lines is kept at a constant value, in order to adjust the responsivity of a unit loop optical path to acoustic frequencies.

4. The Sagnac interferometric sensor array of claim 3, wherein the first sub-delay lines included in different unit loops have different lengths from each other.

5. The Sagnac interferometric sensor array of claim 1, further comprising a depolarizer disposed in the common optical path which all the light pulses traveling in the first and second directions pass through.

6. The Sagnac interferometric sensor array of claim 2, further comprising a depolarizer disposed in the common optical path which all the light pulses traveling in the first and second directions pass through.

7. The Sagnac interferometric sensor array of claim 3, further comprising a depolarizer disposed in the common optical path which all the light pulses traveling in the first and second directions pass through.

8. The Sagnac interferometric sensor array of claim 4, further comprising a depolarizer disposed in the common optical path which all the light pulses traveling in the first and second directions pass through.

9. The Sagnac interferometric sensor array of claim 5, further comprising a phase modulator disposed in the common optical path which all the light pulses traveling in the first and second directions pass through.

10. The Sagnac interferometric sensor array of claim 9, wherein said phase modulator is placed at the location in the common optical path of loop that satisfies the following condition, $$\frac{1}{R} \cdot n + T_m \leq \tau \leq \frac{1}{R} \cdot (n+1) - [T_0 + (N-1)\Delta T], n = 0, 1, 2, \ldots$$

where R is the repetition rate of incident light pulse, $T_m$ is the pulse width of a phase modulation signal, $T_0$ is the width of light pulse, $\Delta T$ is the time delay of a light pulse between adjacent Sagnac loops, N is the number of sensor heads, $\tau$ is the transit time taken by the light pulse from the phase modulator of the first loop including the sensor head to the symmetric location in the opposite side of the loop.

11. A method of detecting acoustic signals, comprising the steps of:

generating light pulses;

introducing said light pulses into a Sagnac interferometric sensor array having a plurality of unit loop optical paths, each unit loop including at least one sensor head;

splitting said light pulses to travel around said plurality of unit loop optical paths in a first and second directions that are opposite from each other;

giving different time delays to said split light pulses traveling around said plurality of unit loop optical paths in the first and second directions, respectively;

interfering said split light pulses which passed around said plurality of unit loop optical paths in opposite directions; and detecting acoustic signal applied to said sensor head by analyzing the interference signal.

12. The method of claim 11, further comprising the step of giving an constant additive phase difference to either a light pulse of traveling in the first direction or a light pulse of traveling in the second direction before the interference step, one of the light pulses being coupled additively with a phase modulation signal pulse by a phase modulator.

13. The method of claim 12, wherein the pulse width of phase modulation signal $T_m$ and the pulse width of light pulse $T_0$ satisfy the relations:

$$T_m \geq T_0$$

and $$\Delta T \geq T_0,$$

and the repetition rate of incident light pulse R satisfies the relation:

$$R \leq 1/[T_m + T_0 + (N-1)\Delta T]$$

where, $\Delta T$ is the propagating time delay of light pulse between adjacent unit loops, and N is the number of sensor heads.

* * * * *